United States Patent [19]

Muller et al.

[11] 3,726,490

[45] Apr. 10, 1973

[54] FILM GUIDING AND THREADING MECHANISM FOR CINEMATOGRAPHIC APPARATUS

[75] Inventors: Hermann Muller, Munich; Dieter Sandl, Baldham; Herbert Wilsch, Unterhaching, all of Germany

[73] Assignee: Agfa-Gevaert Aktiengesellschaft, Leverkusen, Germany

[22] Filed: June 15, 1971

[21] Appl. No.: 153,220

[30] Foreign Application Priority Data

June 16, 1970 Germany.....................P 20 29 741.0

[52] U.S. Cl. ....................242/192, 226/91, 352/157
[51] Int. Cl............................G03b 1/04, G11b 15/32
[58] Field of Search...........................242/192, 195; 226/91, 92; 352/157, 158

[56] References Cited

UNITED STATES PATENTS 3,550,880   12/1970   Palmer...............................242/192

Primary Examiner—Leonard D. Christian
Attorney—Michael S. Striker

[57] ABSTRACT

A film guiding and threading mechanism for motion picture projectors or cameras wherein the supply of convoluted film is supported for rotation in and counter to a direction to pay out the film. The leader of the film can be deflected into a predetermined path by a deflector having a film-engaging tooth which is pivotably mounted on a reciprocable holder. The latter maintains the tip of the tooth in engagement with the outermost convolution of the supply of film while the supply begins to rotate in a direction to pay out the film. The leader of the film pivots the tooth from a first position in which the tip of the tooth bears against the film to a second position in which the tip is spaced from the outermost convolution and cannot damage an oncoming splice or another protuberance on the film. The leader abuts against a concave surface of the tooth and thereby pivots the tooth to the second position in which the outermost convolution of the supply of film is engaged by a convex surface of the tooth.

9 Claims, 4 Drawing Figures

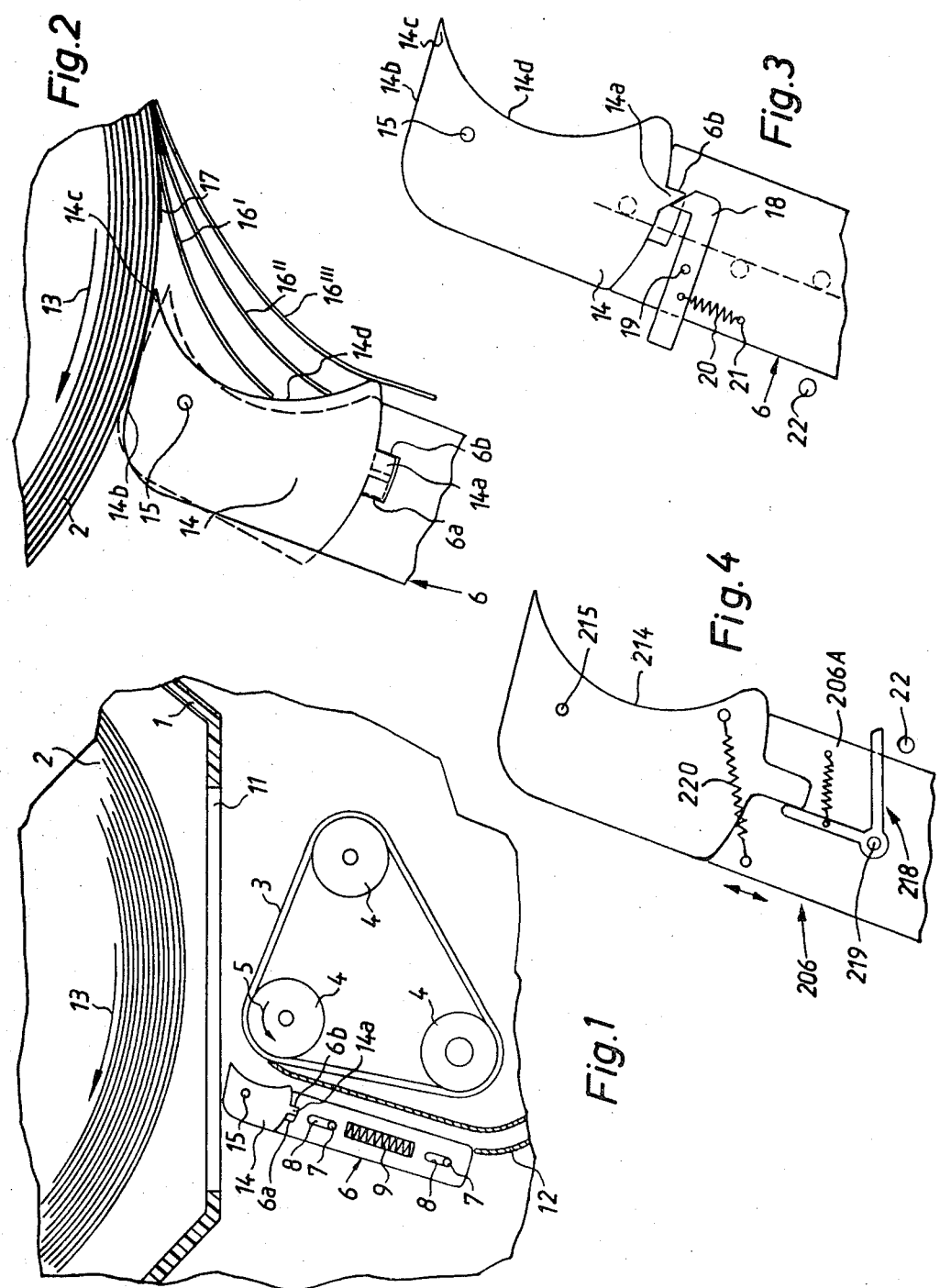

FILM GUIDING AND THREADING MECHANISM FOR CINEMATOGRAPHIC APPARATUS

BACKGROUND OF THE INVENTION

The present invention relates to mechanism for guiding and threading elongated flexible web- or strip-shaped bodies, especially for guiding and threading photographic roll film in cinematographic apparatus. More particularly, the invention relates to improvements in preferably automatic film guiding and threading mechanisms which can be utilized in motion picture cameras or motion picture projectors to direct the leader of photographic film into a path wherein the leader advances toward the core of a takeup reel.

Presently known film guiding and threading mechanisms normally comprise a drive which can rotate a supply of convoluted film in a direction to pay out the film and a deflector which has a tooth or blade movable into engagement with the outermost convolution to thereby deflect the leader into a predetermined path. As a rule, the tooth or blade of the deflector directs the leader against a guide surface which causes the leader to enter the path and to advance toward the takeup reel; such takeup reel can be provided with means for automatically attaching the leader to the core. The tooth or blade of the deflector remains in engagement with the outermost convolution of the supply of convoluted film for a certain interval of time which is long enough to insure that the leader invariably enters the path for travel toward the core of the takeup reel. It is customary to bias the deflector against the outermost convolution by means of one or more springs so that the leader remains in engagement with the supply of film despite the fact that the diameter of the supply decreases in response to rotation in a direction to pay out the film. The deflector is normally withdrawn from contact with the supply of convoluted film after the leader reaches the core of and is preferably automatically attached to the takeup reel.

A drawback of such conventional film guiding and threading mechanisms is that the tooth or blade of the deflector is likely to damage or deface the film, especially if the film consists of two or more sections which are spliced to each other and if the splice is so close to the leader that it is engaged by the deflector before the latter is moved away from the supply of convoluted film. As a rule, a splice between two sections of photographic film comprises one or two adhesive-coated uniting bands which are applied to the opposite sides of the abutting ends of the film sections; therefore, the tooth or blade of the deflector is likely to engage the outer uniting band and to weaken the splice or to completely detach the uniting band from the film sections.

SUMMARY OF THE INVENTION

An object of the invention is to provide a novel and improved film guiding and threading mechanism which can be used in existing cinematographic or like apparatus and is constructed and assembled in such a way that the tip of the tooth or the edge of the blade on the deflector remains in contact with convoluted film for very short intervals of time so that the likelihood of an encounter between the tip of the tooth or the edge of the blade and a splice or other protuberance on the convoluted film is less likely than in presently known mechanisms.

Another object of the invention is to provide a novel and improved deflector for the leader of convoluted motion picture film or the like.

A further object of the invention is to provide a film guiding and threading mechanism which can properly guide the leader of convoluted film despite the fact that the tip of the tooth or the edge of the blade on the deflector is disengaged from the outermost convolution practically immediately following the encounter with the leader so that the tip of the tooth or the edge of the blade cannot contact a splice even if the latter is very closely adjacent to the leader.

An additional object of the invention is to provide a mechanism which can be used to properly guide and thread the leader of a large-, medium- or small-diameter supply of convoluted motion picture film and wherein the leader of the film can terminate the contact between the tip of the tooth or the edge of the blade and the outermost convolution as soon as the leader is separated from the remainder of the film supply to such an extent that it is compelled to enter a predetermined path for travel toward the core of a takeup reel.

The invention is embodied in a film guiding and threading mechanism which is especially suited for use in cinematographic apparatus and comprises a support for a supply of convoluted film having a leader constituting the free end of the outermost convolution of such supply, drive means which is preferably movable from and into frictional engagement with the outermost convolution to rotate the supply in a direction to pay out the film, and novel deflector means which serves to direct the leader into a predetermined path, for example, into a path wherein the leader advances toward and is automatically attached to the core of a takeup reel.

The improved deflector means comprises a film-engaging element which can constitute or which comprises a tooth or blade, and holder means which is movable between an operative or extended position and a retracted or inoperative position and supports the film-engaging element. The latter has a projection which can resemble the tip of a tooth or the edge of a blade and is movable (preferably pivotable) with reference to the holder means between a first position in which its projection abuts against the outermost convolution of the supply to thereby deflect the leader toward or into the aforementioned path in the operative position of the holder means and while the drive means rotates the supply of convoluted film, and a second position in which at least the projection of the film-engaging element is disengaged from the supply even if the holder means continues to dwell in the operative position.

The arrangement is preferably such that the film-engaging element tends to assume its first position and can be moved to its second position by the leader after the latter reaches a position which insures that the leader will advance along the predetermined path in response to further rotation of the supply in a direction to pay out the film. The film-engaging element can be provided with a concave surface located at one side of the projection and extending into the path of movement of the leader when the latter begins or is ready to enter the path, and a convex surface located at the other side of the projection and abutting against the outermost convolution of the supply of film in the second position of the film-engaging element.

The novel features which are considered as characteristic of the invention are set forth in particular in the appended claims. The improved film guiding and threading mechanism itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary vertical sectional view of a cinematographic apparatus having a film guiding and threading mechanism which embodies one form of the invention;

FIG. 2 is an enlarged view of a detail of the structure illustrated in FIG. 1, showing the film engaging element in two positions;

FIG. 3 is a fragmentary elevational view of a second deflector; and

FIG. 4 is a fragmentary elevational view of a third deflector.

DESCRIPTION OF THE PREFERRED EMBODIMENTS

Referring first to FIGS. 1 and 2, there is shown a portion of a cinematographic apparatus, e.g., a motion picture projector, which comprises a housing 1 serving as a carrier for a cartridge or cassette 1a containing a supply 2 of convoluted motion picture film. The housing 1 or the cassette 1a is provided with a spindle 1b or another suitable support for the supply 2; the latter is preferably rotatable in two directions but at least in the direction which is indicated by the arrow 13 to thereby pay out the film. The cassette 1a has a bottom wall provided with an opening 11 through which the leader L of the film can be expelled in order to enter a predetermined path indicated by the arrow 13a for transport toward the core of a takeup reel, not shown. The leader L constitutes the free end portion of the outermost convolution 2a of the supply 2.

The drive means for rotating the supply 2 in the direction indicated by the arrow 13 comprises an endless flexible element 3 (e.g., a belt consisting of elastomeric material) which is trained over three pulleys 4, 4a, 4b. These pulleys are mounted on a carriage 1d which is movable with reference to the housing 1 in and counter to the direction indicated by the arrow 13b. At least one of the pulleys 4, 4a, 4b (for example, the pulley 4) can be driven by an electric motor (not shown) to rotate in the direction indicated by the arrow 5. When the carriage 1d is shifted upwardly, as viewed in FIG. 1 (arrow 13b), the belt 3 engages the outermost convolution 2a and rotates the supply 2 in the direction indicated by the arrow 13 so that the supply pays out the film.

The drive including the pulleys 4, 4a, 4b, the belt 3 and the motor which drives the belt 3 constitutes one component of the improved film guiding and threading mechanism. This mechanism further comprises a deflector 6 which is also mounted on the carriage 1d and is movable with the drive in and counter to the direction indicated by the arrow 13b. The deflector 6 comprises an elongated holder or slide 6A which is provided with aligned slots 8 for guide pins 7 secured to the carriage 1d. A spring 9 which reacts against the carriage 1d urges the holder 6A in the direction indicated by the arrow 13c so that the pins 7 are normally received in the lower end portions of the respective slots 8. The deflector 6 is movable by the carriage 1d from the position shown in FIG. 1 (this is the retracted or inoperative position of the holder 6A to a second position corresponding to the extended or operative position of the holder 6A (shown in FIG. 2).

The deflector 6 further comprises a film-engaging element 14 which resembles a two-armed lever and is pivotably secured to the holder 6A by a pin 15. One arm of the element 14 comprises a projection in the form of a tooth 14c and the other arm of the element 14 has a finger 14a which is located between two stops 6a, 6b provided on the holder 6A. When the carriage 1d maintains the holder 6A in the operative position of FIG. 2 (in which the belt 3 of the drive engages the outermost convolution 2a of the supply 2), the tip of the tooth 14c on the film-engaging element 14 initially assumes a first position which is shown in FIG. 2 by solid lines and in which the finger 14a abuts against the stop 6b of the holder 6A. The tip of the tooth 14c automatically assumes such first position when the supply 2 begins to rotate in the direction indicated by the arrow 13 because the outermost convolution 2a is in relatively strong frictional engagement with the tip due to the provision of spring 9 which undergoes at least some stressing when the carriage 1d maintains the holder 6A in the operative position of FIG. 2. The reference character 12 denotes in FIG. 1 a channel which defines the path (arrow 13a) along which the leader L must advance toward the core of the takeup reel. The channel 12 can be mounted on the carriage 1d or in the housing 1.

The film-engaging element 14 is further provided with a concave surface 14d which faces the drive means for the supply 2 and with a convex surface 14b located at the opposite side of the tip of the tooth 14c. As the belt 3 rotates the supply in the direction indicated by the arrow 13, the leader L of the outermost convolution 2a first engages the concave surface 14d at a point close to the tip of the tooth 14c (see the position 16' in FIG. 2). As the supply 2 continues to rotate, the leader L slides along the concave surface 14d and its material is sufficiently stiff to pivot the element 14 to the second position which is indicated in FIG. 2 by broken lines. In such second position, the tip of the tooth 14c is remote from the external surface of the supply 2 which surface is then engaged by the convex surface 14b. Therefore, the element 14 cannot damage or deface the film even if it remains in relatively long-lasting engagement with the supply 2. The reference character 17 denotes in FIG. 2 a splice having an adhesive uniting band which extends beyond the external surface of the convolution 2b. It will be noted that the splice 17 can readily bypass the tip of the tooth 14c in the second position of the element 14 even if the splice is located very close to the leader L. The convex surface 14b cannot detach the uniting band from the two abutting sections of film which are joined by the splice 17 so that the uniting band can move past the point of contact between the convex surface 14b and the supply 2.

As the belt 3 continues to rotate the supply 2 in the direction indicated by the arrow 13, the leader L continues to slide along the concave surface 14d and thereby maintains the tip of the tooth 14c out of engagement with the supply 2. The leader L advances through and beyond the positions 16'' and 16''' of FIG. 2 and enters the inlet of the channel 12 to thereupon advance in the direction indicated by the arrow 13a. The carriage 1d can be retracted in a direction counter to that indicated by the arrow 13b as soon as the leader L reaches the inlet of the channel 12 or as soon as the leader cannot avoid entering the inlet in response to further rotation of the supply 2 (arrow 13).

The stop 6a of the holder 6A serves to arrest the element 14 in the second position which is indicated in FIG. 2 by broken lines. It is unimportant whether or not the element 14 is held in the first or second end position when the holder 6A dwells in the retracted position because the element 14 is compelled to assume its first position (shown in FIG. 2 by solid lines) as soon as the convex surface 14b engages the outermost convolution 2a and as soon as the belt 3 starts to rotate the supply 2 in the direction indicated by the arrow 13. The movement of the element 14 to its second end position (in which the tip of the tooth 14c is remote from the external surface of the supply 2) takes place in automatic response to engagement between the concave surface 14d and the leader L. The spring 9 insures that the tip of the tooth 14c or the convex surface 14b bears against the supply 2 with a certain force, and this spring also insures that the deflector 6 can be used for properly guiding the leaders of supplies having outermost convolutions of relatively small, medium or large diameter.

The film-engaging element 14 can be mounted on the holder 6A in such a way that it is completely disengaged from the supply 2 as soon as the leader L engages the concave surface 14d. Thus, the leader can disengage from the film not only the tip of the tooth 14c but also the entire element 14, as soon as the film guiding and threading mechanism insures that the leader L will invariably find its way into the channel 12 and will advance toward the core of the takeup reel.

An important advantage of the feature that the tip of the tooth 14c can be disengaged from the outermost convolution by the leader L is that the tip is disengaged from the film in a fully automatic way and immediately after the leader L is deflected toward or into the path defined by the channel 12. The outlay for the mechanism shown in FIGS. 1 and 2 is relatively small since the aforediscussed advantages can be achieved by the simple expedient of mounting the element 14 on a pivot pin (15) of the holder 6A and by providing the latter with stop means 6a, 6b which can arrest the element 14 in the respective end positions.

The cassette 1a can be one of several cassettes which can be mounted in or on the housing 1 to be movable seriatim into a position for projection of the information stored on the respective films onto a screen or the like. It is also possible to replace the cassette 1a with a magazine which contains one or more supplies or rolls of convoluted film or to store a single supply 2 on a supply reel which is rotatably mounted in or on the housing 1.

The holder 6A is preferably parallel or nearly parallel with that stretch of the belt 3 which extends between the pulleys 4 and 4b to define therewith a gap wherein the leader L advances toward the inlet of the channel 12. In the embodiment of FIG. 1, one wall of the channel 12 extends all the way to the level of the axis of the driven pulley 4.

FIG. 3 illustrates a portion of a modified deflector 106 which comprises a reciprocable holder 106A and a somewhat modified film-engaging element 114. The latter has a tooth-shaped protuberance 114a replacing the arm 14a of the element 14, a projection or tooth 114c, a concave surface 114d and a convex surface 114b. The pivot pin for the element 114 is shown at 115 and one stop for the protuberance 114a is shown at 106b. The holder 106A further supports a second stop here shown as a pivotable blocking pawl 18 which can turn on a pin 19 of the holder 106A and has a pallet 18a abutting against an inclined flank 114a' of the protuberance 114a in the second position of the element 114, namely, in that position in which the tip of the tooth 114c is disengaged from the outermost convolution of a supply of convoluted film while the holder 106A dwells in its operative or extended position. A stationary abutment 22 is mounted in or on the housing of the cinematographic apparatus in the path of movement of the pawl 18 to pivot the latter against the opposition of a spring 20 to thereby disengage the pallet 18a from the protuberance 114a and to thus permit movement of the element 114 to its first position. It will be seen that the element 114 is free to assume its first position in response to retraction of the holder 106A and that the tip of the tooth 114c automatically engages the outermost convolution of a supply of convoluted film when the holder 106A is returned to its operative position. As the leader L (not shown in FIG. 3) bears against the concave surface 114d, the element 114 is caused to pivot in a clockwise direction whereby the pallet 18a slides along the inclined flank 114a' of the protuberance 114a and permits the element 114 to assume its second position in which the tip of the tooth 114c is disengaged from the supply of convoluted film. The pallet 18a serves as a substitute for the stop 6a of FIGS. 1 and 2. The spring 20 is attached to the left-hand arm of the pawl 18 and to a post 21 on the holder 106A.

The pawl 18 insures that the tip of the tooth 114c cannot return into engagement with the supply of convoluted film once the leader of the film has pivoted the element 114 in a clockwise direction so that the flank 114a' of the protuberance 114a is located to the left of the flank 18a' on the pallet 18a. A weak spring (not shown) can be provided to bias the protuberance 114a against the stop 106b, i.e., to urge the element 114 to its first position.

FIG. 4 illustrates a portion of a deflector 206 having a reciprocable holder 206A, a film-engaging element 214 which is pivotably mounted on a pin 215 of the holder 206A, a lever 218 which is pivotable on a pin 219 of the holder 206A, and a spring 220 which which biases the element 214 in the direction indicated by the arrow. The lever 218 normally holds the element 214 in the first end position in which the tip of the tooth 214c bears against the outermost convolution of a supply of film. When the holder 206A is moved to its retracted position, the lever 218 is disengaged from the element 214 and the spring 220 is free to move the element 214 to the other end position.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A film guiding and threading mechanism, particularly for use in cinematographic apparatus, comprising a support for a supply of convoluted film having a leader constituting the free end of the outermost convolution of said supply; drive means for rotating said supply in a direction to pay out the film; and deflector means for directing the leader of said outermost convolution into a predetermined path, said deflector means having a film-engaging element, holder means supporting said element and movable between an operative position and a retracted position, said element having a projection and being movable with reference to said holder means between a first position in which said projection bears against the outermost convolution of said supply to thereby deflect the leader into said path in the operative position of said holder means and while said drive means rotates said supply and a second position in which at least said projection of said element is disengaged from said supply, and first and second stop means provided on said means for respectively arresting said element in said first and second positions thereof, one of said stop means being movable with reference to said holder means to and from a position in which said one stop means arrests said element in said second position thereof.

2. A mechanism as defined in claim 1, wherein said element is movable to said second position thereof in response to engagement with the leader while said drive means rotates said supply in the operative position of said holder means.

3. A mechanism as defined in claim 1, further comprising means for disengaging said one stop means from said element in response to movement of said holder means to said retracted position.

4. A mechanism as defined in claim 1, wherein said element is pivotable with reference to said holder means.

5. A film guiding and threading mechanism, particularly for use in cinematographic apparatus, comprising a support for a supply of convoluted film having a leader constituting the free end of the outermost convolution of said supply; drive means for rotating said supply in a direction to pay out the film; and deflector means for directing the leader of said outermost convolution into a predetermined path, said deflector means having a film-engaging element, holder means supporting said element and movable between an operative position and a retracted position, said element having a projection and being movable with reference to said holder means between a first position in which said projection bears against the outermost convolution of said supply to thereby deflect the leader into said path in the operative position of said holder means and while said drive means rotates said supply and a second position in which at least said projection of said element is disengaged from said supply, and stop means for arresting said element in at least one of said positions thereof, said stop means comprising a lever pivotably mounted on said holder means and operatively connected with said element to maintain the latter in said first position in the operative position of said holder means and to permit said element to assume said second position in response to movement of said holder means to said retracted position.

6. A mechanism as defined in claim 5, wherein said element is movable to said second position thereof in response to engagement with the leader while said drive means rotates said supply in the operative position of said holder means.

7. A mechanism as defined in claim 5, wherein said element is pivotable with reference to said holder means.

8. A mechanism as defined in claim 5, further comprising biasing means for urging said element to said second position.

9. A film guiding and threading mechanism, particularly for use in cinematographic apparatus, comprising a support for a supply of convoluted film having a leader constituting the free end of the outermost convolution of said supply; drive means for rotating said supply in a direction to pay out the film; and deflector means for directing the leader of said outermost convolution into a predetermined path, said deflector means having a film-engaging element and holder means supporting said element and movable between an operative position and a retracted position, said element having a projection and being pivotable with reference to said holder means between a first position in which said projection bears against the outermost convolution of said supply to thereby deflect the leader into said path in the operative position of said holder means and while said drive means rotates said supply and a second position in which at least said projection of said element is disengaged from said supply, said element having a concave surface along which the leader of said outermost convolution advances on its way into said path to thereby pivot said element from said first to said second position and a convex surface which abuts against the supply in the second position of said element and while said holder means dwells in said operative position.

* * * * *